United States Patent
Doneux et al.

(10) Patent No.: US 11,011,147 B2
(45) Date of Patent: May 18, 2021

(54) SHEET MATERIAL WITH A CELLULAR STRUCTURE AND/OR A PROCESS FOR PRODUCING SAME

(71) Applicant: ACOUSTIC SPACE PTY LTD, Annandale (AU)

(72) Inventors: Philippe Pierre Marie Joseph Doneux, Annandale (AU); Bela Takacs, South Bowenfels (AU)

( * ) Notice: Subject to any disclaimer, the term of this patent is extended or adjusted under 35 U.S.C. 154(b) by 177 days.

(21) Appl. No.: 15/550,664

(22) PCT Filed: Feb. 12, 2016

(86) PCT No.: PCT/AU2016/050089
§ 371 (c)(1),
(2) Date: Aug. 11, 2017

(87) PCT Pub. No.: WO2016/127219
PCT Pub. Date: Aug. 18, 2016

(65) Prior Publication Data
US 2018/0025715 A1  Jan. 25, 2018

(30) Foreign Application Priority Data

Feb. 13, 2015 (AU) ................................. 2015900459

(51) Int. Cl.
| | | |
|---|---|---|
| *G10K 11/162* | (2006.01) | |
| *E04B 1/82* | (2006.01) | |
| *C08J 5/18* | (2006.01) | |
| *E04B 1/84* | (2006.01) | |
| *E04C 2/20* | (2006.01) | |
| *C08J 9/00* | (2006.01) | |
| *C04B 38/02* | (2006.01) | |
| *C08L 27/06* | (2006.01) | |
| *E04B 1/74* | (2006.01) | |
| *C04B 111/52* | (2006.01) | |

(52) U.S. Cl.
CPC ............ *G10K 11/162* (2013.01); *C04B 38/02* (2013.01); *C08J 9/0023* (2013.01); *C08J 9/0066* (2013.01); *E04B 1/8409* (2013.01); *E04C 2/20* (2013.01); *C04B 2111/52* (2013.01); *C08J 2205/052* (2013.01); *C08J 2327/06* (2013.01); *E04B 2001/742* (2013.01)

(58) Field of Classification Search
CPC .... C08L 27/06; C08J 5/18; C08J 9/232; C08J 9/0066; E04B 1/82; E04B 1/84; E04B 1/8409; G10K 11/162; G10K 11/165; C04B 38/02
See application file for complete search history.

(56) References Cited

U.S. PATENT DOCUMENTS

| | | | |
|---|---|---|---|
| 5,622,662 A | 4/1997 | Veiga et al. | |
| 5,641,584 A * | 6/1997 | Andersen | B28B 1/00 106/675 |
| 6,180,037 B1 * | 1/2001 | Andersen | C08L 1/28 264/108 |
| 6,784,230 B1 * | 8/2004 | Patterson | C08J 9/0061 524/13 |
| 8,393,438 B2 * | 3/2013 | Ogawa | B32B 5/26 181/286 |
| 9,957,369 B2 * | 5/2018 | Topolkaraev | C08L 23/10 |
| 2006/0029788 A1 * | 2/2006 | Lovell | B32B 5/18 428/304.4 |
| 2011/0237145 A1 * | 9/2011 | Steinke | B29C 44/1209 442/152 |
| 2013/0310471 A1 | 11/2013 | Becker et al. | |
| 2013/0310472 A1 | 11/2013 | Becker et al. | |
| 2013/0310473 A1 | 11/2013 | Becker et al. | |
| 2014/0087081 A1 | 3/2014 | Horton | |
| 2016/0130465 A1 | 5/2016 | Cheng | |
| 2016/0130799 A1 * | 5/2016 | Topolkaraev | E04B 1/74 52/408 |

FOREIGN PATENT DOCUMENTS

| | | |
|---|---|---|
| CN | 103396622 A | 11/2013 |
| WO | 2015007113 A1 | 1/2015 |

OTHER PUBLICATIONS

International Search Report for Application No. PCT/AU2016/050089 dated May 4, 2016.
European Search Report for Application No. 16748489.8-1101/3256527 dated Sep. 12, 2018.

* cited by examiner

*Primary Examiner* — Edgardo San Martin
(74) *Attorney, Agent, or Firm* — Tarolli, Sundheim, Covell & Tummino LLP

(57) ABSTRACT

A sheet material with a cellular structure wherein the sheet material is produced by preparing a composition including PVC, a filler material and a plasticiser and providing a cellular structure within the composition prior to curing to form the sheet material. The composition may further include a cellular structure promoting agent. The sheet material with a cellular structure may be used in building applications and has advantageous sound attenuation, thermal conductivity, resilience and impact resistance properties.

33 Claims, No Drawings

SHEET MATERIAL WITH A CELLULAR STRUCTURE AND/OR A PROCESS FOR PRODUCING SAME

RELATED APPLICATIONS

The present invention is a U.S. National Stage under 35 USC 371 patent application, claiming priority to Serial No. PCT/AU2016/050089, filed on 12 Feb. 2016; which claims priority of AU 2015900459, filed on 13 Feb. 2015, the entirety of both of which are incorporated herein by reference.

The present invention relates to a sheet material with a cellular structure which also includes sound dampening properties and sound attenuation properties. The present invention relates to a composition for producing the sheet material that is also environmentally friendly and in addition, the present invention also relates to a process for producing the sheet material with a cellular structure.

BACKGROUND

Sound dampening (or acoustic attenuation) properties are found in materials with a high sound transmission loss. The sound transmission loss of a material is determined by various physical factors.

An example of a sheet material with sound dampening properties is what is termed a loaded vinyl. Such a material is produced by formulating a composition with a high density which is then combined with vinyl at formulation stage. The resulting product, or sheet material has a high density whilst still maintaining high flexibility and thereby providing good sound dampening properties.

However, whilst loaded vinyl provides a sheet material that may be used effectively within wall assemblies for its sound dampening properties, it is less suitable when used as part of a flooring assembly or as a pipe lagging due to the physical constraints of the material.

The present invention seeks to provide a composition for producing sheet material with sound dampening properties which is better suited to various applications within buildings and building assemblies that loaded vinyl. The present invention also seeks to provide a process for producing such a sheet material.

SUMMARY

In accordance with one aspect the present invention provides a sheet material with a cellular structure wherein the sheet material is produced by preparing a composition including PVC, a filler material and a plasticiser and providing a cellular structure within the composition prior to curing to form the sheet material.

In accordance with another aspect the present invention provides a composition for producing a sheet material with a cellular structure, the composition including the following components:
  (a) about 5 to about 25 weight % of PVC,
  (b) about 50 to about 75 weight % of a filler material,
  (c) about 10 to about 40 weight % of a plasticiser, and
  (d) about 0.05 to about 2.0 weight % of a cellular structure promoting agent.

In one form the composition includes about 8 to about 12 weight % of PVC. In a further form the composition includes about 10 weight % of PVC. In a further form PVC is in the form of a PVC paste resin.

In one form the composition includes about 58 to about 68 weight % of a filler material. In one form the composition includes about 65 weight % of a filler material. In one form the density of the filler material is greater than 1 g/cm3. In one form the density of the filler material is about 2.0 to about 5.0 g/cm3. In one form the filler material is selected from a material including calcium carbonate, sand, glass or recycled glass, silica, Ilmenite, and/or barium sulphate.

In one form the composition includes about 20 to about 30 weight % of a plasticiser. In one form the composition includes about 25 weight % of a plasticiser.

In one form the plasticiser is selected from one or more phthalates. In one form the one or more phthalates are selected from the following: dioctyl phthalate (DOP), diisononyl phthalate (DINP), di-2-propyl heptyl phthalate (DPHP), diisodecyl phthalate (DIDP), and non-phthalates such as 1,2-cyclohexane dicarboxylic acid diisononyl ester (DINCH), dioctyl terephthalate (DOTP), and citrate esters. In one form the plasticiser is dioctyl phthalate (DOP).

In one form the composition includes about 0.1 to about 1.0 weight % of a cellular structure promoting agent. In one form the composition includes about 0.25 weight % of a cellular structure promoting agent. In one form the cellular structure promoting agent includes one or more surfactants. In one form the one or more surfactants is/are selected from anionic, cationic, non-ionic or zwitterionic surfactants. In a further form the one or more surfactants is/are selected from an anionic surfactant. In still a further form the one or more surfactants is/are selected from an alkylbenzenesulfonate, an aliphatic amine oxide or an amine oxide.

In one form the cellular structure promoting agent includes sodium sulphate.

In one form the cellular structure promoting agent includes one or more of the following: C12-C13 alcohol EO 2:1 sodium sulfate; lauramidopropylamine oxide and myristamidopropyl amine oxide. In a further form the cellular structure promoting agent includes at least two of the following: C12-C13 alcohol EO 2:1 sodium sulphate, lauramidopropylamine oxide and myristamidopropyl amine oxide. In yet a further form the cellular structure promoting agent further includes one or more of the following: magnesium sulphate, tetrasodium EDTA or free oil.

According to another aspect the present invention provides a process for producing a sheet material with a cellular structure the process including the steps of:
  a. preparing a composition including the steps of:
    i. providing 10 to about 40 weight % of a plasticiser;
    ii. mixing about 0.05 to about 2.00 weight % of a cellular structure promoting agent with the plasticiser to provide a first mixture;
    iii. mixing about 5 to about 25 weight % of PVC into the first mixture to form a second mixture;
    iv. mixing about 50 to about 75 weight % of a filler material into the second mixture to form the composition, the above weight % calculated on the weight of the total composition,
  b. forming the composition into a sheet; and
  c. heating the sheet formed from the composition in step b. to promote the cellular structure within the composition and to cure the composition.

In one form the first mixture is in the form of an emulsion. In one form the mixing in step a. ii. is carried out in an emulsifier. In a further form the mixing in step a. ii. is carried out in the absence of air.

In one form the composition is formed into a sheet at step b. using a knife coating step.

In one form the heating at step c. is conducted at a temperature of about 150° C. to about 200° C. In a further form the heating at step c. provides sufficient heat to heat the core of the sheet formed from the composition to about 100° C.

In one form mixing the PVC into the first mixture to form a second mixture at step a. iii. occurs at a temperature of about 40° C.

According to another aspect the present invention provides a sheet material prepared from a composition as herein described or from a process as herein described.

In one form the sheet material includes a cellular structure with closed cell structure. In one form the closed cell structure includes an average cell diameter size of between about 0.1 and about 1000 micrometres.

In one form the sheet material has a density of about 0.8 to about 2.0 g/cm³. In another form the sheet material has a density of about 1.0 to about 1.4 g/cm³.

DETAILED DESCRIPTION OF EMBODIMENTS

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

As used herein the term "PVC" refers to polyvinyl chloride or poly(vinyl chloride). In certain embodiments, PVC may be provided as a constituent of the composition as herein described in the form of a PVC paste resin.

In certain embodiments, the filler material included as a constituent of the composition as herein described may be chosen from any suitable material that is generally unreactive within the composition. In addition it is advantageous if the filler material has a density of between about 2.0 to about 5.0 g/cm3. Calcium carbonate, sand, glass or recycled glass, silica, Ilmenite, and/or barium sulphate are examples of materials that may be selected as filler materials used individually or in combination.

As used herein, the term "plasticiser" refers to an additive that when included within the composition as herein described increases the plasticity or fluidity of the composition. In certain embodiments the plasticiser may be selected from a phthalate or a phthalate ester. In certain embodiments, the plasticiser may be selected from any one or more of the following: dioctyl phthalate (DOP), diisononyl phthalate (DINP), di-2-propyl heptyl phthalate (DPHP), diisodecyl phthalate (DIDP), and non-phthalates such as 1,2-cyclohexane dicarboxylic acid diisononyl ester (DINCH), dioctyl terephthalate (DOTP), and citrate esters. In one form the plasticiser is dioctyl phthalate (DOP).

In certain embodiments the cellular structure promoting agent may selected from a compound that reacts to produce a gas when included in the composition as herein described thereby providing the cellular structure within the resultant sheet material once the composition is cured. In certain embodiments, the cellular structure promoting agent reacts once the composition is undergoing a curing step at an elevated temperature of over 100° C., or in one form at a temperature of about 150° C. to about 200° C. In certain embodiments, the cellular structure promoting agent reacts when the core of the sheet formed of the composition reaches approximately 100° C.

In certain embodiments the cellular structure promoting agent includes one or more surfactants that may be selected from anionic, cationic, non-ionic or zwitterionic surfactants.

In certain embodiments, the surfactant is an anionic surfactant. As used herein, the term anionic surfactant refers to a surfactant containing anionic functional groups, such as sulphate, sulphonate, phosphate, and carboxylates. Anionic surfactants include alkyl sulphates such as ammonium lauryl sulphate, sodium lauryl sulphate (SDS, sodium dodecyl sulphate, another name for the compound) and alkyl-ether sulphates sodium laureth sulphate, also known as sodium lauryl ether sulfate (SLES), sodium myreth sulfate, docusates including dioctyl sodium sulfosuccinate, perfluorooctanesulfonate (PFOS), perfluorobutanesulfonate, linear alkylbenzene sulfonates (LABs), alkyl-aryl ether phosphates and alkyl ether phosphates, carboxylates including alkyl carboxylates, such as sodium stearate; sodium lauroyl sarcosinate and carboxylate-based fluorosurfactants such as perfluorononanoate, perfluorooctanoate (PFOA or PFO).

In certain embodiments, the cellular structure promoting agent includes one or more surfactants that may be selected from an alkylbenzenesulfonate, an aliphatic amine oxide or an amine oxide. In certain embodiments, the cellular structure promoting agent includes one or more of the following: sodium sulphate, magnesium sulphate, tetrasodium EDTA or free oil.

It was surprisingly found that the inclusion of a cellular structure promoting agent together with the plasticizer and PVC component of the composition provided a composition that when formed into a sheet or other structure and allowed to cured at over 100° C. and preferably at about 150° C. to about 200° C., provided a sheet material with a cellular structure throughout its composition. In particular it was found that the cellular structure appearing throughout was a closed cell cellular structure that provided the resultant sheet material with significantly increased resilience properties when compared to a material such as commonly known loaded vinyl.

In addition, the cellular structure within the resultant sheet material composed from the composition as herein described provided significant sound dampening or sound attenuating characteristics when compared with a material such as commonly known loaded vinyl. The sheet material with a cellular structure once formed has a density of about 0.8 to about 2.0 g/cm³. In addition to the high density, the sheet material is very flexible and has a high elastic memory. The combination of the high density and the flexibility provides that the sheet material has excellent sound dampening properties.

In an alternative embodiment, the sheet material with a cellular structure is produced by preparing a composition including PVC, a filler material and a plasticiser and providing a cellular structure within the composition prior to curing to form the sheet material. In this form the cellular structure may be provided by incorporating a gas into the composition without a cellular structure promoting agent per se. In such an alternative form, the cellular structure may be provided by incorporating a gas, such as an inert gas into the composition whilst the composition is under pressure. Once the pressure is reduced, the gas incorporated within the composition may expand thereby producing the cellular structure.

In certain embodiments the sheet material with a cellular structure as herein described may be prepared by a process including the following steps:

step a. preparing a composition including the steps of:
i. providing a plasticiser;
ii. mixing a cellular structure promoting agent with the plasticiser to provide a first mixture;
iii. mixing PVC into the first mixture to form a second mixture;
iv. mixing a filler material into the second mixture to form the composition,
step b. forming the composition into a sheet; and
step c. heating the sheet formed from the composition in step b. to promote the cellular structure within the composition and to cure the composition.

In certain embodiments the first mixture (prepared at step a ii) is in the form of an emulsion and the mixing step to produce the first mixture may be carried out in an emulsifier in an environment in the absence of air. The emulsifier that may be used for the mixing step may be selected from a "SLOT" type emulsifier which may for example perform the mixing step at an RPM of about 2800.

It was found that the mixing step at step a ii is quite important for the resultant cellular structure of the sheet material produced by the process as it was found that the shear provided in this step meant the cellular structure promoting agent within the composition was activated sufficiently to achieve the desired closed cell structure within the sheet material.

Indeed it was also found that the longer the period of mixing, or emulsifying, at step a. ii. in the above outlined process, the smaller the cell structure of the resultant sheet material.

The composition may be formed into a sheet at step b. using a knife coating step. Although it is envisaged there may be other methods of forming a sheet that would be readily apparent to those skilled in the art that may also be used in conjunction with the process as herein described.

In certain embodiments, mixing of the PVC into the first mixture (at step a. iii) to form the second mixture occurs at above about 32° C. and in certain embodiments up to about 40° C. to achieve the optimum required emulsion mix. Without wishing to be bound by theory, it was found this temperature requirement was particularly beneficial when sodium sulphate was used as part of the cellular structure promoting agent. In certain embodiments, the shear generated as part of the mixing steps at step a. ii. and step a. iii. is sufficient to heat the mixture up to at least up to 32° C. and in certain embodiments up to about 40° C. At step a. iv. the filler material is added to the second mixture which may bring the temperature of the resultant composition down from about 40° C. This may be due to the temperature of the filler material being generally at ambient or room temperature which may be lower than the temperature of the second mixture produced at step a. iii.

In certain embodiments, the heating at step c. is conducted at a temperature of about 150° C. to about 200° C. and this step may provide sufficient heat to heat the core of the sheet formed from the composition to about 100° C.

In certain embodiments, the mixing step at step a. ii. may take approximately 5 to 20 minutes to complete; the mixing step at step a. iii. may take approximately 40 to 80 minutes to complete; and/or the mixing step at step a. iv. may take approximately 10 to 40 minutes to complete.

During the process to produce the sheet material with sound dampening properties, the composition may also be coloured by using any suitable colouring technique to produce sheeting in any colour that may be desired.

In certain embodiments the composition as herein described and/or the process as herein described may be used to produce a sheet material with a cellular structure of various thicknesses. In certain embodiments, the thickness of the sheet material taken from one major planar surface to another major planar surface may be from 1 mm to about 50 mm in thickness and usually in the range of about 1 mm to about 16 mm in thickness for most applications and often in the range of about 4 mm to about 10 mm.

The sheet material with a cellular structure was found to have increased resilience, low thermal conductivity and increased sound dampening characteristics when compared to commonly used sound attenuation building sheeting material such as loaded vinyl. As such, the sheet material with a cellular structure produced in this way was found to be highly suitable for a variety of applications within building assemblies where sound attenuation was desired such as for example as a pipe lagging, an underlay for flooring assemblies as well as for component in wall assemblies.

The cellular structure of the sheet material produced from the composition and/or the process as herein described unexpectedly had a significant increase in the Sound Transmission Loss (STL) for a given weight by about 2 to 4 dB when compared with other common sound attenuation building products such as loaded vinyl sheeting.

In addition, the cellular structure of the sheet material also provides an additional advantage in that it provides significant thermal insulation when used as part of a building construction due to the closed cell cellular structure which provides the thermal rating is very similar to other forms of commercially available insulation.

For example, the thermal Conductivity for rigid PVC is 0.14-0.28 W/mK and for flexible PVC: 0.14-0.17. The sheet material with a cellular structure produced from the composition and/or the process as herein described included a specific mass of 20-50 kg/m$^3$ and a thermal conductivity 0.035 W/mK.

In a further embodiment, the sheet material with a cellular structure may be bonded to a construction panel such as for example a plasterboard panel to produce a composite building material. Indeed in a further embodiment the sheet material with a cellular structure may be sandwiched between two construction panels such as plasterboard to produce a composite building material. The sheet material with a cellular structure may be situated between the construction panel in one continuous layer, or alternatively in discrete spaced apart sections. Because of the material properties of the sheet material during the formation stage, it is not required to use an adhesive between the sheet material with a cellular structure and another material such as a construction panel if bonded to the sheet material during the curing step when the sheet material is being produced.

The construction panel may be composed of any common construction panel material such as for example plaster board, plywood and fibro.

Such a composite building material may be used in a variety of applications where a construction panel may be used with the added benefit of providing a construction panel with increased sound insulation properties from conventional construction panels.

In an embodiment where the sheet material with a cellular structure is bonded to one side of a constructional panel, the resulting composite building material may be cut to size by first scoring or cutting through the side of they composite material including the sheet material with a cellular structure. The composite building material may then be snapped or folded to break through the construction panel layer along the line of the score/cut thereby providing the composite building material in the desired size for a building application.

The density of the final product can be tuned from 0.8-2 SG which equates to a density of about 0.8 to about 2.0 g/cm3. This is achieved by reducing or increasing the cell structure which may be achieved during the mixing step (step a. ii.) wherein if a smaller cell structure is provided then the resultant sheet material has a higher density.

The acoustic attenuation properties of the sheet material produced by the composition and/or the process described herein were found to be better than the currently available loaded vinyl sheeting by approximately 2-4 dB. In addition, the sheet material was found to provide a much lighter product by approximately 2 kg/m² than the loaded vinyl.

Due to the light weight and the increased resilience of the sheet material that was found to be primarily from the closed cell structure and the excellent sound attenuation properties, the sheet material as herein described was found to be particular suitable for applications including under flooring products such as an underlay for ceramic tiles, engineered timber floors or other floor coverings.

As the sheet material was also found to have an increase to its vibration damping effect compared to existing loaded vinyl the sheet material may also be used within wall assemblies where it may be sandwiched between 2 construction boards such as plywood, plasterboard or FC sheeting which was found to increase the overall STL (Sound Transmission Loss) by 2-4 dB.

It was also found that the closed cell cellular structure of the sheet material increased the rate or speed of the vibrational decay generated in the product (by air-borne noise) and thus, when installed as a "loose" curtain will be more effective at reducing the noise from one side of the curtain to the other.

The present invention will become better understood from the following examples of preferred but non-limiting embodiments thereof.

Example 1

A sheet material was produced by the following process including the steps of:
a. preparing a composition including the steps of:
i. providing 25 weight % of DOP;
ii. mixing 0.25 weight % of alkylbenzenesulfonate with the DOP to provide a first mixture;
iii. mixing 10 weight % of PVC into the first mixture to form a second mixture;
iv. mixing 65 weight % of a calcium carbonate into the second mixture to form the composition, the above weight % calculated on the weight of the total composition,
b. forming the composition into a sheet; and
c. heating the sheet formed from the composition in step b. to at least 170° C. to promote the cellular structure within the composition and to cure the composition.

The resulting sheet material was then used as a pipe lagging and a series of acoustic tests were performed to analyse the acoustic attenuation properties of the sheet material.

The tests included a comparison of the performance of the sheet material used as a pipe lagging with a standard commercially available pipe lagging product. The standard commercially available pipe lagging product had a weight of 5 kg/m2 whereas the sheet material had a weight of only 3 kg/m2 (in red)

Results

Test 1—Pipe Lagged with standard commercially available lagging

|  | LAmax | LAeq | SEL |
|---|---|---|---|
| 1 | 58.3 | 50.6 | 62.7 |
| 2 | 56.2 | 51.2 | 62.3 |
| 3 | 56.2 | 49.9 | 62.2 |
| Average | 56.9 | 50.6 | 62.4 |

Test 2—Pipe Unlagged

|  | LAmax | LAeq | SEL |
|---|---|---|---|
| 1 | 67.3 | 59.8 | 72.2 |
| 2 | 67.4 | 59.4 | 72.2 |
| 3 | 66.9 | 58.3 | 72.1 |
| Average | 67.2 | 59.2 | 72.2 |

Test 3—Sheet Material

|  | LAmax | LAeq | SEL |
|---|---|---|---|
| 1 | 57.9 | 51.2 | 63.3 |
| 2 | 58.4 | 51.3 | 63.3 |
| 3 | 57.5 | 51.1 | 63.1 |
| Average | 57.9 | 51.2 | 63.2 |

SUMMARY

|  | LAmax | LAeq | SEL |
|---|---|---|---|
| Average commercially available | 56.9 | 50.6 | 62.4 |
| Average sheet material | 57.9 | 51.2 | 63.2 |
| Average pipe unlagged | 67.2 | 59.2 | 72.2 |

SEL is the sound exposure level

The results demonstrate that the sheet material provides approximately the same SEL for a substantially lighter (2 kg/m2) noise barrier that for the standard commercially available pipe lagging mass at a weight of 5 kg/m2.

Example 2

Using the process as outlined in example 1, with the exception that the cellular structure promoting agent included at step a ii included the following compounds: C12-C13 alcohol EO 2:1 sodium sulfate; lauramidopropylamine oxide and myristamidopropyl amine oxide, a sheet material with a cellular structure was produced with a thickness of 6 mm.

Several varying examples of floor assemblies were prepared in source room where the sheet material was used as an underlay within the floor assemblies. A test was implemented to measure the field floor impact sound insulation performance between the source room and a room (the receiver room) located immediately below on an underneath floor to the source room. Inspection of the receiver room indicated ceilings were composed of suspended plasterboard with surface mounted ceiling lighting.

The sample floor assemblies tested are as listed in the following table:

TABLE 1

Sample Floor Covering Tested

| Test ID | ID Name | Hard Floor Covering |
|---|---|---|
| 1 | Sample Tile + Sheet material | Tile loosely laid ontop of 30 mm screed |
| 2 | Sample Tile + FC sheets + Sheet material | Tile laid ontop of 2 layers of 6 mm FC |
| 3 | Timber + Sheet material | 12 mm Tongue and groove engineered timber floor |

One location in the source room was used for the tapping machine and 8 airborne sound measurements were taken in the receiving room. The Calculations for the Field Floor Impact Sound Insulation performance were carried out for each sample floor tested in the source room in accordance with AS/NZS ISO 140.7.

Instrumentation used to measure noise in this test was a SVAN (Type 1) Sound Analyzer Model 945A Serial No 9418. One third octave band results were recorded within the instrument for each measurement and these results used to calculate the single number figures and plot the results.

Complying field calibration checks for the instrument were carried out using a Acoustic Calibrator Type Rion NC 73 Serial No. 11127967. All instruments held current NATA calibration certificates and the measurement instruments are in accordance with the requirements of AS 1259.2, Sound Level Metres, Integrating and Averaging.

Impact sound in the source room was generated using a BSWA-TEC tapping machine, Model No TM002, Serial No. 1Z17, manufactured in accordance with the requirements of AS/ISO 140, BS5821, EN 20140, ASTM E492, GB J75-84. Receiver sound was measured in the receiver room directly under the point of impact of the tapping machine.

Results

A summary of the results, the By-Law Requirement and Compliance is shown in the following table:

TABLE 2

Field Floor Impact Insulation Test Results

| Test ID | ID Name | Source/ Receiver Rm. | Measured L'nTw + (CI) |
|---|---|---|---|
| 1 | Tile & Underlay | Living/Lounge | 38 − (1.5) = 36.5 dB |
| 2 | Tile & FC & Underlay | Living/Lounge | 37 − (4.5) = 32.5 dB |
| 3 | Timber & Underlay | Living/Lounge | 41 − (0.2) = 40.8 dB |

The test results indicated the addition of the sheet material as a component of various floor assemblies resulted in the equivalent of a 6 star rating for sound attenuation.

Many modifications will be apparent to those skilled in the art without departing from the scope of the present invention.

The invention claimed is:

1. A composition for producing a sheet material with a closed cell cellular structure, the composition including the following components:

(a) about 5 to about 25 weight % of PVC;
(b) about 50 to about 75 weight % of a filler material;
(c) about 10 to about 40 weight % of a plasticiser; and
(d) about 0.05 to about 2.0 weight % of a cellular structure promoting agent,
wherein the cellular structure promoting agent includes one or more surfactants selected from an alkylbenzenesulfonate, an aliphatic amine oxide or an amine oxide, and
wherein the PVC is mixed with the cellular structure promoting agent, the plasticiser, and the filler material to form the composition.

2. A composition according to claim 1 wherein the composition includes about 8 to about 12 weight % of PVC.

3. A composition according to claim 1 wherein the composition includes about 10 weight % of PVC.

4. A composition according to claim 1 wherein the PVC is in the form of a PVC paste resin.

5. A composition according to claim 1 wherein the composition includes about 58 to about 68 weight % of a filler material.

6. A composition according to claim 1 wherein the composition includes about 65 weight % of a filler material.

7. A composition according to claim 1 wherein the density of the filler material is greater than 1 g/cm$^3$.

8. A composition according to claim 1 wherein the density of the filler material is about 2.0 to about 5.0 g/cm$^3$.

9. A composition according to claim 1 wherein the filler material is selected from calcium carbonate, sand, glass or recycled glass, silica, Ilmenite, and/or barium sulphate.

10. A composition according to claim 1 wherein the composition includes about 20 to about 30 weight % of a plasticiser.

11. A composition according to claim 1 wherein the composition includes about 25 weight % of a plasticiser.

12. A composition according to claim 1 wherein the plasticiser is selected from one or more phthalates.

13. A composition according to claim 12 wherein the one or more phthalates are selected from the following: dioctyl phthalate (DOP), diisononyl phthalate (DINP), di-2-propyl heptyl phthalate (DPHP), diisodecyl phthalate (DIDP), and non-phthalates such as 1,2-cyclohexane dicarboxylic acid diisononyl ester (DINCH), dioctyl terephthalate (DOTP), and citrate esters.

14. A composition according to claim 12 wherein the plasticiser is dioctyl phthalate (DOP).

15. A composition according to claim 1 wherein the composition includes about 0.1 to about 1.0 weight % of a cellular structure promoting agent.

16. A composition according to claim 1 wherein the composition includes about 0.25 weight % of a cellular structure promoting agent.

17. A composition according to claim 1 wherein the cellular structure promoting agent includes sodium sulfate.

18. A composition according to claim 1 wherein the cellular structure promoting agent includes one or more of the following: C12-C13 alcohol EO 2:1 sodium sulfate; lauramidopropylamine oxide and myristamidopropyl amine oxide.

19. A composition according to claim 1 wherein the cellular structure promoting agent includes at least two of the following: C12-C13 alcohol EO 2:1 sodium sulfate, lauramidopropylamine oxide and myristamidopropyl amine oxide.

20. A composition according to claim 17 wherein the cellular structure promoting agent further includes one or more of the following: magnesium sulphate, tetrasodium EDTA or free oil.

21. A process for producing a sheet material with a closed cell cellular structure the process including the steps of:
   a. preparing a composition including the steps of:
      i. providing about 10 to about 40 weight % of a plasticiser;
      ii. mixing about 0.05 to about 2.00 weight % of a cellular structure promoting agent with the plasticiser to provide a first mixture;
      iii. mixing about 5 to about 25 weight % of PVC into the first mixture to form a second mixture;
      iv. mixing about 50 to about 75 weight % of a filler material into the second mixture to form the composition, the weight % calculated on the weight of the total composition,
   b. forming the composition into a sheet; and
   c. heating the sheet formed from the composition in step b. to promote the cellular structure within the composition and to cure the composition,
   wherein the cellular structure promoting agent includes one or more surfactants selected from an alkylbenzenesulfonate, an aliphatic amine oxide or an amine oxide.

22. A process according to claim 21 wherein the first mixture is in the form of an emulsion.

23. A process according to claim 21 wherein the mixing in step a. ii. is carried out in an emulsifier.

24. A process according to claim 21 wherein the mixing in step a. ii. is carried out in the absence of air.

25. A process according to claim 21 wherein the composition is formed into a sheet at step b. using a knife coating step.

26. A process according to claim 21 wherein the heating at step c. is conducted at a temperature of about 150° C. to about 200° C.

27. A process according to claim 21 wherein the heating at step c. provides sufficient heat to heat the core of the sheet formed from the composition to about 100° C.

28. A process according to claim 21 wherein mixing the PVC into the first mixture to form a second mixture at step a. iii. occurs at a temperature of about 40° C.

29. A sheet material prepared from a composition according to claim 1.

30. A sheet material according to claim 29 wherein the closed cell structure includes an average cell size of between about 0.1 and about 1000 micrometres.

31. A sheet material according to claim 29 wherein the sheet material has a density of about 0.8 to about 2.0 g/cm$^3$.

32. A sheet material with a closed cell cellular structure wherein the sheet material is produced by preparing a composition including PVC, a filler material, a plasticiser, and a cellular structure promoting agent, wherein the PVC is mixed with the cellular structure promoting agent, the plasticiser, and the filler material to form the composition and providing a cellular structure within the composition prior to curing to form the sheet material, wherein the cellular structure promoting agent includes one or more surfactants selected from an alkylbenzenesulfonate, an aliphatic amine oxide or an amine oxide.

33. A sheet material according to claim 32 wherein the sheet material is prepared from a composition including the following components:
   (a) about 5 to about 25 weight % of the PVC;
   (b) about 50 to about 75 weight % of the filler material;
   (c) about 10 to about 40 weight % of the plasticiser; and
   (d) about 0.05 to about 2.0 weight % of the cellular structure promoting agent.

* * * * *